(12) United States Patent
Rife

(10) Patent No.: US 11,535,149 B1
(45) Date of Patent: Dec. 27, 2022

(54) STAND OFF FOR MOUNTING A VEHICLE LAMP OR ACCESSORY EQUIPMENT

(71) Applicant: Robert Thomas Rife, Tonawanda, NY (US)

(72) Inventor: Robert Thomas Rife, Tonawanda, NY (US)

( * ) Notice: Subject to any disclaimer, the term of this patent is extended or adjusted under 35 U.S.C. 154(b) by 0 days.

(21) Appl. No.: 17/493,649

(22) Filed: Oct. 4, 2021

(51) Int. Cl.
*B60Q 1/26* (2006.01)
*B60Q 1/34* (2006.01)

(52) U.S. Cl.
CPC ............ *B60Q 1/2615* (2013.01); *B60Q 1/34* (2013.01)

(58) Field of Classification Search
CPC ................................ B60Q 1/2615; B60Q 1/34
See application file for complete search history.

(56) References Cited

U.S. PATENT DOCUMENTS

| | | | |
|---|---|---|---|
| 2,829,241 A * | 4/1958 | Yee | B60Q 1/2607 362/544 |
| 3,059,104 A | 10/1962 | Dickson | |
| 3,067,974 A | 12/1962 | Baldwin | |
| 3,400,262 A | 9/1968 | Newman | |
| 3,454,757 A | 7/1969 | Bell | |
| 4,891,625 A | 1/1990 | Van Riper | |
| 6,533,445 B1 | 3/2003 | Rogers | |
| 7,431,485 B1 | 10/2008 | Saward | |
| 8,827,518 B2 | 9/2014 | Smith | |

* cited by examiner

*Primary Examiner* — Thomas M Sember

(57) ABSTRACT

A standoff apparatus is provided for facilitating the mounting or retrofitting a vehicle accessory or, in a preferred embodiment, a single studded combination marker/turn signal lamp to a vehicle fender and its purpose to provide additional lighting to alert other motorist or pedestrian of the vehicles presence and the operator's intension. There is an upper standoff body, a common selective ring shim, a lower adaptor, a common washer and a shoulder nut provided to secure the lamp and mount assembly. Secondary securing hardware is also provided which include: a common socket head bolt, a second common selective shim, a common rubber laminated washer and a common locking nut.

28 Claims, 3 Drawing Sheets

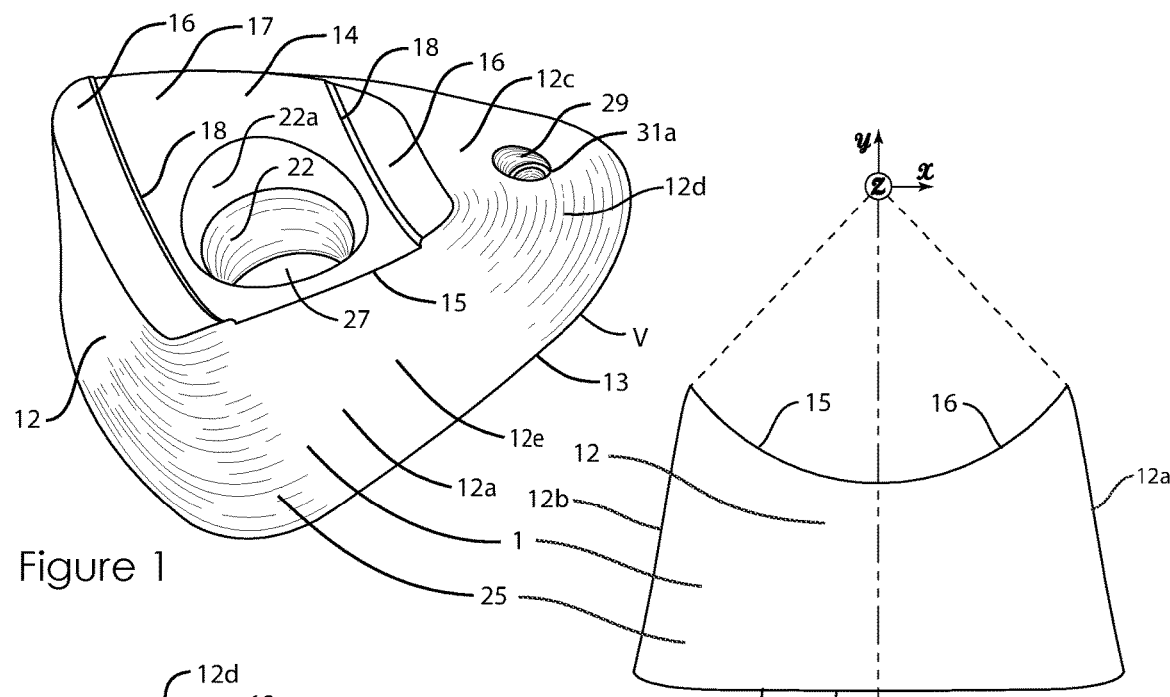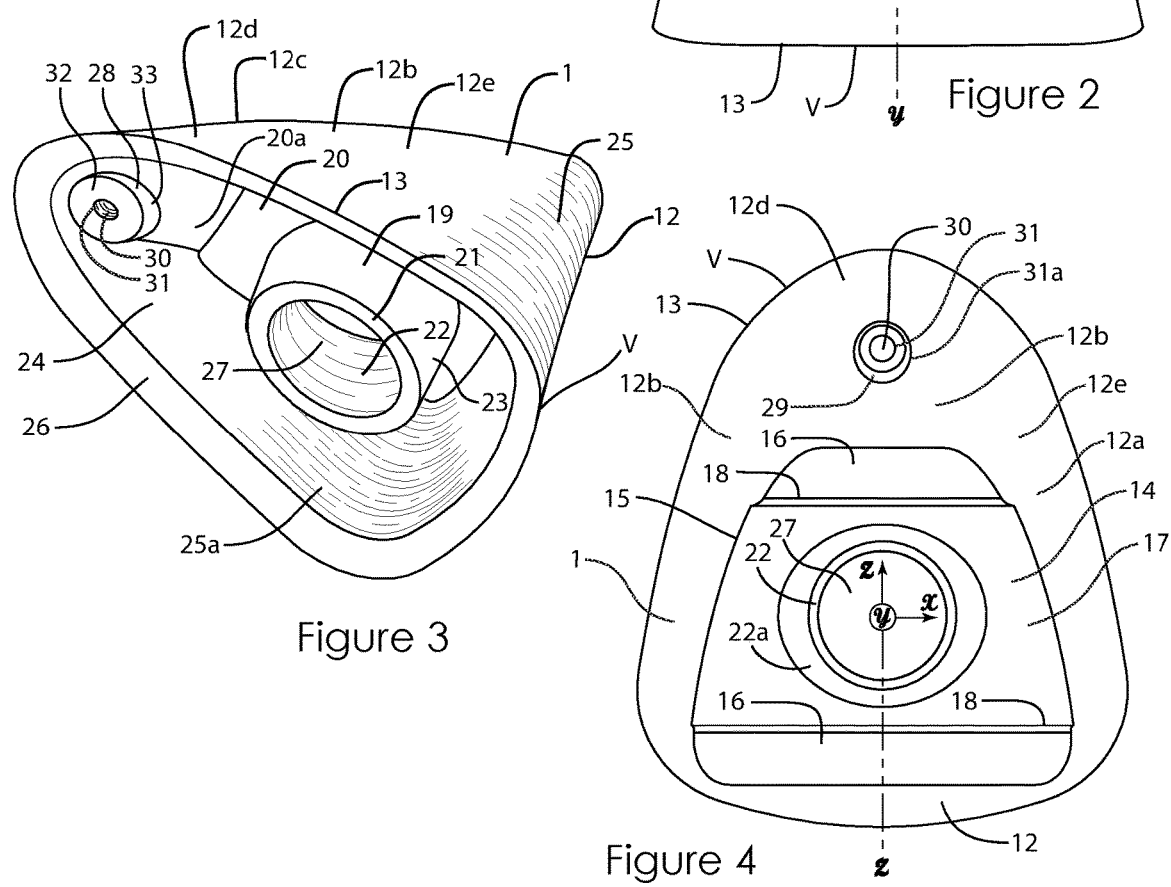

STAND OFF FOR MOUNTING A VEHICLE LAMP OR ACCESSORY EQUIPMENT

FIELD OF INVENTION

This invention is directed to mounting a vehicle lamp or accessory equipment.

BACKGROUND OF INVENTION

There exists a need for a standoff for the purpose of mounting or retrofitting, in a preferred embodiment, a single studded combination marker/turn signal lamp to a vehicle fender and is directed to those skilled in the art of locating, indicating and drilling a vehicles fender for the purpose of mounting said lamp.

Existing manufactured single stud lamps do not provide a substantial mounting footprint, require a mating gasket and offer little stability to secure the lamp to the panel to which they are installed. Thus, the mounted lamp compromises the integrity of the panel causing cracks, discoloration and loosening.

What is needed is a standoff that can be adapted and captured between a lamp and a panel that provides a large footprint and made of a suitable material that can flex to conform and seal, thus, eliminating the need for a gasket when installed to a flat, curved or convex panel or, in a preferred embodiment, a vehicle fender. A lower adaptor and securing hardware is provided to secure the lamp and the standoff apparatus. The Upper Standoff can be easily positioned on the fender, orientating the lamp level and parallel to the vehicles longitudinal centerline wherein the fender can be drilled by indicating the centers through the bores provided for mounting the lamp.

In addition, this standoff offers a Unique, Aesthetic and Original Equipment appearance and the components can be painted to further customize and compliment the installation.

SUMMARY OF INVENTION

A stand-off apparatus for mounting a vehicle lamp or accessory equipment is provided.

The apparatus includes standoff assembly components and secondary securing assembly components. The standoff assembly includes; an upper standoff mount, a common selective ring shim, a conical lower adaptor, a common washer and a shoulder nut. The secondary securing assembly components include; a common socket head bolt, common rubber laminated washer and a common locking nut.

Both the upper standoff and the lower adaptor can be manufactured of a flexible material such as Thermo Plastic Polyurethane (TPU) that is paint compatible and configured following Draft Angle Guidelines for Injection Molding.

The lamp standoff secondary securing assembly includes a socket head bolt, a common selective ring shim, a rubber laminated washer and a locking nut.

The upper standoff mount body, in a preferred embodiment, is a generally pyramidal configuration lofted along a common central vertical axis path. The body, having a steep surrounding surface, with a relatively long sloped top rear portion, is defined and constrained by a top portions, front to back, saddles closed non-planer contours perimeter edge and a relatively large, teardrop shape, bottom portions closed non-planer contour perimeter edge.

The standoff mount body has been shelled defining an interior open to the bottom portion and a periphery wall having an interior surface and an end face defining an edge that has been beveled to the lower portion perimeter edge.

There is a first integral conical boss extending, a predetermined distance downward, from an interior surface of the saddle, along the common central vertical axis and a second conical boss extending, a predetermined distance downward, from an interior surface of the long sloped back portion, along a second common axis, being on a longitudinal plane through the common central vertical axis wherein both bosses, having end faces, are constrained to within the interior.

The first and second conical bosses are bored through, conically, from the top portion saddle and the top rear portion of the lofted body along their respective axes wherein the conical bore through second conical boss has been counter bored from the top.

In a preferred application, the upper standoff mount can be poised to a vehicles fender, at a desired location, wherein the fender can be indicated through interiors of the first and second conical bosses for the purpose of drilling said fender. A cylindrical housing of single studded vehicle lamp, in a preferred embodiment, can be disposed within the saddle wherein the stud of the lamp passes through the interior of the first conical boss and its respective drilled hole in the fender and the socket head bolt can be inserted through the interior of the second conical boss and its respective drilled hole in the fender.

The conical lower adaptor, having a large concave end face and a small end face, is conically bored through its length and can be disposed on the stud of the lamp as such the concave end face seats to the underside of the vehicles fender. The washer is disposed on the stud of the lamp and the shoulder nut threaded to the stud of the lamp wherein the turned down portion of the shoulder nut is capable of passing through the washer, the conical bore of the lower adaptor and the drilled hole in the fender.

In other preferred embodiments the dimensions and configurations of the components can be varied to accommodate different lamps or accessories and to the surface to which they are to be mounted.

BRIEF DESCRIPTION OF DRAWINGS

FIG. 1 is a top perspective view of, in a preferred embodiment, a lamp mount standoff.

FIG. 2 is a front view of the lamp mount standoff with an X, Y, Z coordinate system designated.

FIG. 3 is a bottom perspective view of the lamp mount standoff.

FIG. 4 is a top view of the lamp mount standoff with an axis L designated on a plane referenced by axis Y and Z.

DETAILED DESCRIPTION OF DRAWINGS

Figure 5:
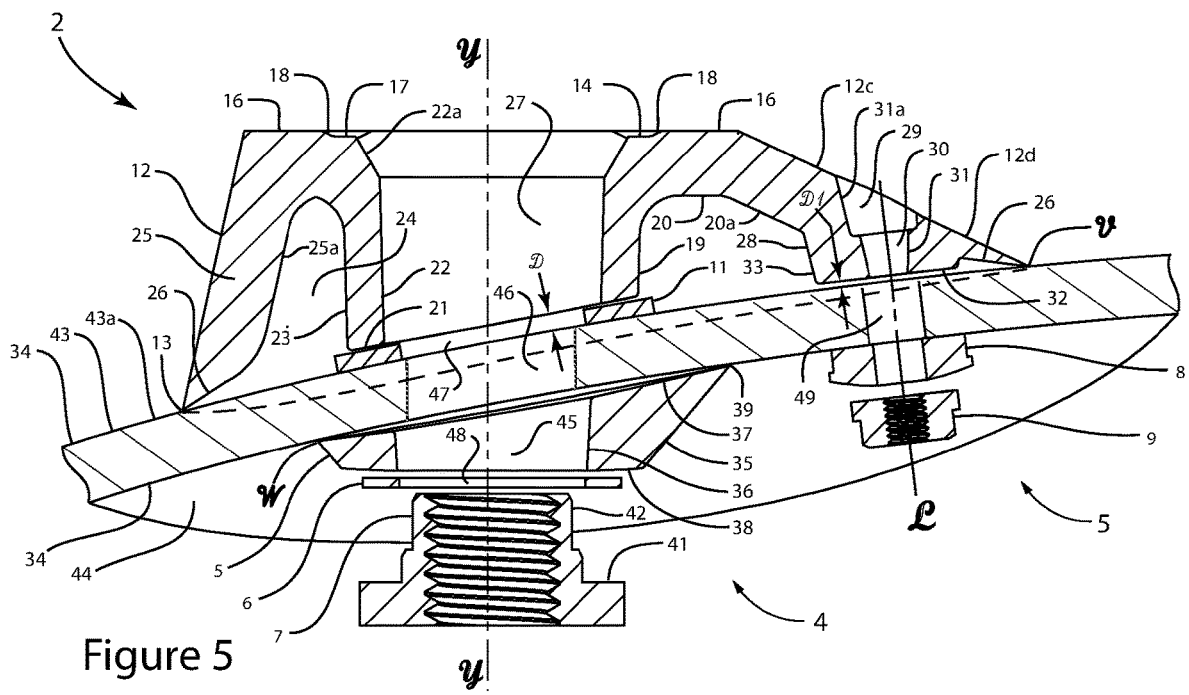
FIG. 5 is a side detailed sectional view per FIG. 8 of a lamp mount standoff assembly taken along line Y-Y of FIG. 8 wherein, in a preferred embodiment, the lamp mount standoff apparatus is disposed to a convex panel of a vehicle fender.
Figure 7:
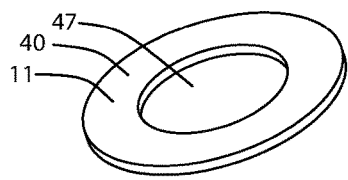
FIG. 7 are top perspective views of a the common selective ring shims

In the following description common reference numbers are used to designate the same parts, pieces or components, surfaces or elements that are shown in the drawing figures. For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated devices, and further applications of the principles of the invention as illustrated therein are herein contemplated as would normally occur to one skilled in the art to which the invention relates.

A lamp standoff mount apparatus 2 is shown in FIGS. 5, 6, 8, 9 and 10 and comprises a standoff mount assembly 4 and a secondary securing assembly 5. The standoff mount assembly 4 best shown in FIGS. 5, 9 and 10 includes an upper standoff mount 1, a void D wherein a common selective ring shim 11 is disposed (FIGS. 5 and 6), a lower adaptor 5, a washer 6 and a shoulder nut 7. The lamp standoff secondary securing assembly 5 shown in FIGS. 5, 9 and 10 includes a socket head bolt 10, a void D1 wherein a common selective ring shim 11a is disposed (FIG. 5), a rubber laminated washer 8 and a locking nut 9. The mount standoff apparatus is for facilitating the mounting, in a preferred embodiment, a combination marker/turn signal lamp to a vehicle fender and its purpose to provide additional lighting to alert other motorist or pedestrian of the vehicles presence and the operator's intension.

The upper standoff mount 1 is shown in FIGS. 1-4 and best shows the standoff 1 bodies general pyramidal lofted configuration along a of FIGS. 2, 4, 5, 6, 8 and 9 wherein a steep front portion 12 curves around and rearward, transitioning along narrowing steep opposite sides 12a and 12b, and again, transitioning around forming a relatively long, sloping top rear portion 12c of a rear portion 12d establishing a surrounding exterior surface 12e defined and constrained by a lower portions relatively large, closed and non-planer contour perimeter edge 13 and an upper portions saddle 14 closed and non-planer contour perimeter edge 15. Furthermore the upper standoff mount 1 is shelled, hence, forming a peripheral wall 25 having an interior 24 that is open at the bottom. There is a first conical boss 19 and a second conical boss 28 within the interior wherein the interior is 24 defined by interior surfaces 20, 20a, 25a, a beveled face 26, an exterior surface 23 of the conical boss 19 and an exterior surface 33 of the conical boss 28 best shown in FIGS. 3, 5, 6 and 10.

Figure 6:
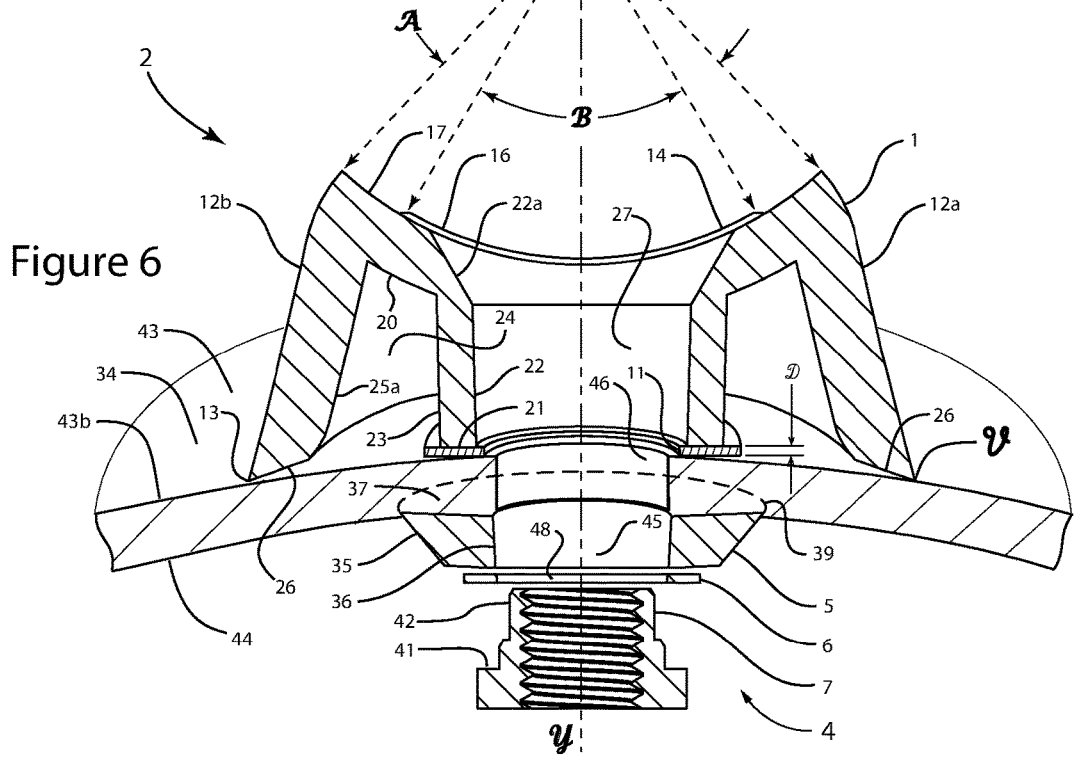
FIG. 6 is a front detailed sectional view per taken along line Y-Y of FIG. 9 showing the X, Y, Z coordinate system and center point arch angles circumferences of a saddle, in the preferred embodiment, of a lamp mount standoff apparatus wherein the lamp mount standoff is disposed to a convex panel as such that the top surface of a panels curve extends to within the interior of the upper standoff mount.
Figure 8:
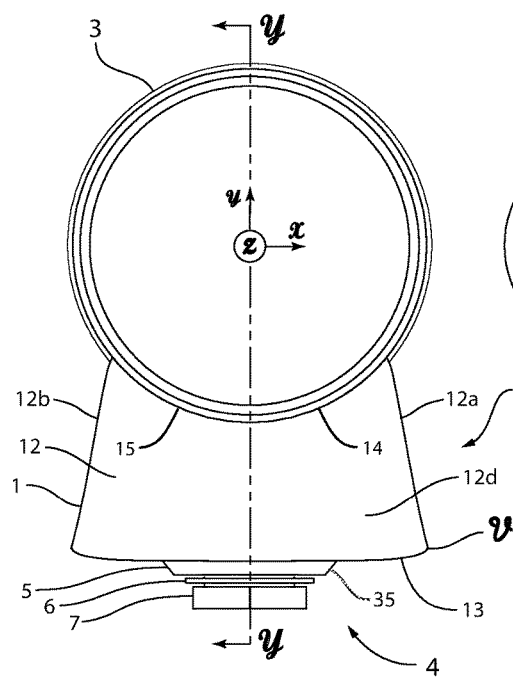
FIG. 8 is a front view of the lamp mount standoff apparatus wherein the lamp is disposed in saddle of the mount standoff and the main securing components disposed accordingly.
Figure 9:
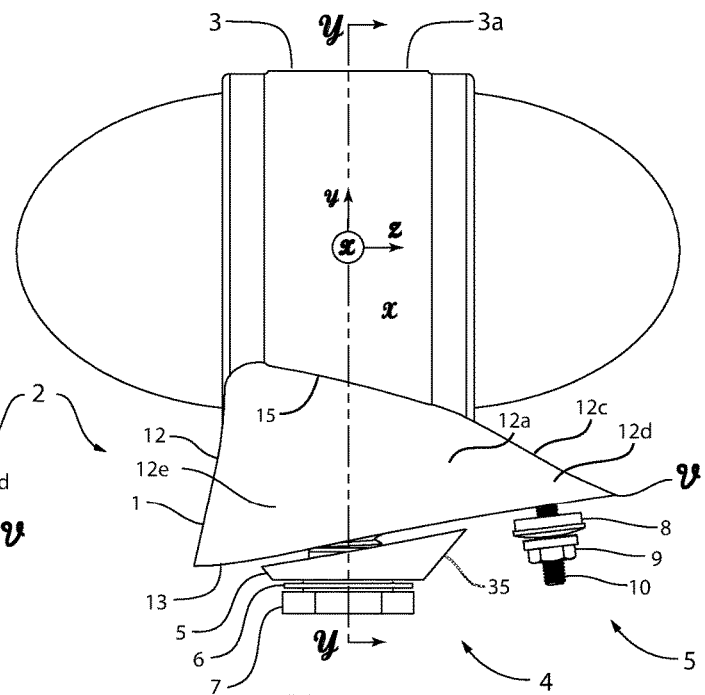
FIG. 9 is a side view of the lamp mount standoff apparatus wherein a lamp is disposed in the saddle of the mount standoff and the main securing components disposed on the stud of the lamp and secondary securing components disposed to the mount standoff.
Figure 10:
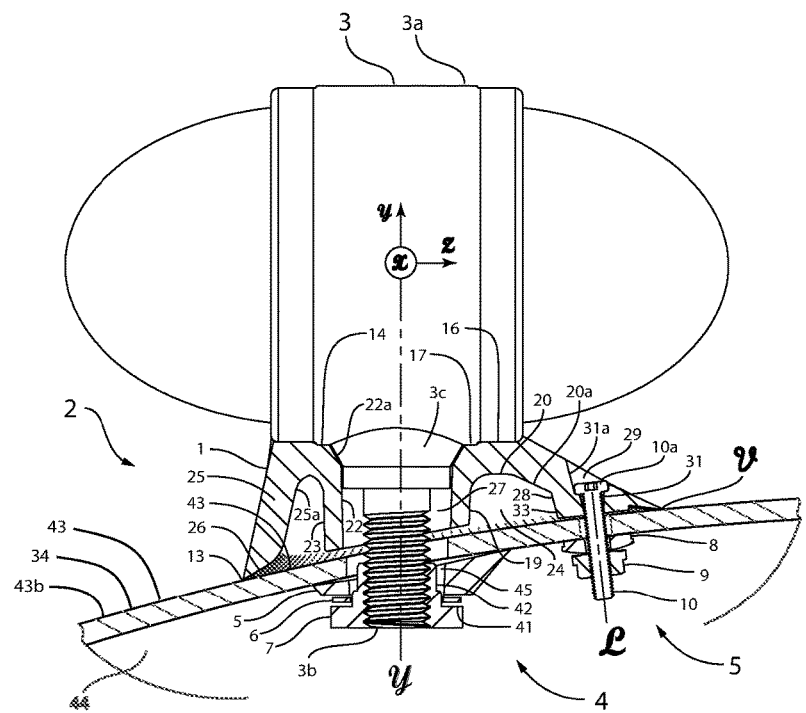
FIG. 10 is a side view per FIG. 8 wherein the mount standoff and the lower securing components are sectioned along line Y-Y of FIG. 8.

FIGS. 1, 2, 4, 5, 6, 8 and 9 best shows the upper standoff mount 1 upper portions stepped saddle 14 with pre determined radii concentric along the Z Axis having surfaces 16, 17 and shoulders 18, with pre determined center point arch angles A and B under 180° Shown in FIG. 6, defining a closed and non-planer contour perimeter edge 15 (FIGS. 1-4, 9 and 10) wherein the housing 3a of studded lamp 3 is disposed in as shown in FIGS. 8-10. The perimeter edge 15 is non-planar in relation to a plane perpendicular to of FIGS. 2, 6, 8 and 9

Shown in FIGS. 3, 5, 6 and 10 the lower portion of the upper standoff mount 1 is open to the interior 24 with the exterior surface 12e and a beveled face 26 defining a vertex V following the closed path perimeter edge 13.

The perimeter edge 13 is non-planar and at a predetermined angle in relation to a plane perpendicular to axis Y and was created with a predetermined arch profile represented by Arch 43a (FIG. 5) swept cut along a predetermined arc path represented by Arch 43b (FIG. 6) and is configured to flex, conform and seal to various flat, curved or in particular, shown in FIGS. 5, 6 and 10, a convex face 43 as it extends to within the interior 24 of, in a preferred embodiment, a vehicle fender 34 when secured with lower adaptor 5 and securing assembly components 4 and 5 shown in FIGS. 5, 6, 9 and 10 thus eliminating the need for a gasket.

FIGS. 1, 3, 4, 5, 6 and 10 shows the first conical boss 19, drafting inward, extending a predetermined distance vertically downward from interior surface 20 within interior 24 concentrically along axis Y of FIGS. 5, 6 and 10. The upper standoff mount 1 is conically bored and beveled, drafting inward, down through surface 17 of saddle 14 and boss 19 concentrically along the common vertical central axis Y of FIGS. 5, 6 and 10 having an interior 27 defined by a conical interior surface 22 and its beveled face 22a with the first boss 19 having an end face 21 at a predetermined distance D from the convex surface 43 of fender 34 (FIGS. 5 & 6) wherein the end face 21 is defined by the conical exterior surface 23 and conical interior surface. The interior 27 is provided to both indicate the fender for drilling, as the upper mount is disposed to the fender at the desired location, and to receive the stud 3b and a conical portion 3c of lamp housing 3a as shown in FIG. 10.

FIGS. 3, 5 and 10 shows the second conical boss 28, drafting inward, extending a predetermined distance downward from interior surface 20a, within interior 24, concentrically along the common axis L, being on a longitudinal plane through axis Y (FIG. 4) and perpendicular to arch 43b. The standoff mount 1 is conically bored and counter bored, drafting inward, down through the top rear portion 12c through boss 28, concentrically along the common axis L, having an interior 30 defined by a conical interior surface 31 and the counter bore having an interior 29 defined by its conical interior surface 31a with the second conical boss 28 having an end face 32 at a predetermined distance D1 the convex surface 43 of the fender 34 (FIG. 5) wherein the end face 31 is defined by exterior surface 33 and conical interior surface 31. The Interior 30 is provided to both indicate the fender for drilling, as the upper mount is disposed to the fender at the desired location, and to receive socket head bolt 10 wherein the head 10a of socket head bolt 10 is partially concealed within interior 29 as shown in FIG. 10.

The lower mount adaptor 5 of assembly 4 Shown in FIGS. 5, 6, 8, 9 and 10 is provided and its body is a conical extrusion along the common vertical central axis Y bored through concentrically having a conical interior surface 36 defining interior 45 and exterior surface 35. The lower mount adaptor 5 has a large concaved end face 37 and an opposite smaller end face 38 perpendicular to the common vertical central axis Y of the bore. The concaved end face 37 and exterior surface 35 defines a vertex W following closed a perimeter edge 39

The concave end face 37 can be 90 degrees or, in the preferred embodiment, angled in relation to the common vertical central axis Y of the bore. The lower mount adaptor 5 can be rotated about the common vertical central axis Y of the stud 3b, wherein the perimeter edge 39 of concave face 37 can be orientated generally parallel and flex accordingly conforming flush to the underside 44 of the fender 34, thus orientating a face 40 of washer 6 and a face 41 of shoulder nut 7 parallel to the end face 38 when secured with shoulder nut 7. It should be further understood the turned down portion 42 of shoulder nut 7 is capable of extending through the interior 48 of washer 6 and interior 45 of lower adaptor 5 for the threads of shoulder nut 7 to engage threads of stud 3b in the event of a thicker fender 34. In the event of a thinner wall of fender 34, the turned down portion 42 of shoulder nut 7 passing through, also, the interior 47 of common selective ring shim 11 and the interior 27 of upper standoff mount 1

As shown in FIGS. 8, 9 and 10 the housing 3a of lamp 3 is disposed with in saddle 14 of upper standoff mount 1 and where the upper standoff mount 1 is disposed between the lamp 3 and the surface 43 of fender 34 orientating the common Z Axis level and parallel to the centerline of vehicle wherein stud 3b, shown in FIG. 10, is disposed linearly and concentrically along common vertical central common vertical central axis Y through the interior 27 of upper standoff mount 1, interior 47 of common selective ring shim 11 and passing through interior 46 of an installers pre drilled hole in fender 34 the interior 45 of lower adaptor 5 and interior 48 of washer 6. The lamp 3 is then secured with shoulder nut 7 threadably connectable to the stud 3b as it is tightened such that components of assembly 4 have secured apparatus 2 to fender 34 of the vehicle.

FIGS. 5, 6 and 10 best shows the perimeter edge 13 and bevels 26 conformed along and flush to surface 43 of fender 34. It should be further understood that the common selective ring shim 11 is provided and disposed at the void D between face 21 of the first conical boss 19 of the upper standoff mount 1 and surface 43 of the fender 34 (FIGS. 5 and 6) to limit the deflection of perimeter edge 13 along bevel 26 of the upper mount 1, thus, providing positive lock down of the lamp and apparatus 2 along common vertical central axis Y as shoulder nut 7 is tightened. Alternative to shim 11, a setting compound can be applied to the end face 21 within void D upon installation as such, that components 4 are partially secured with shoulder nut 7 and can be then, after curing time of compound, fully secured with shoulder nut 7, thus providing a positive lock down of apparatus 2 to the fender 34 of the vehicle.

The components of the secondary assembly 5 shown in FIG. 5 and in particular FIGS. 9 and 10 are disposed such that the socket head bolt 10 is inserted along common axis L through the interior 30 of the upper standoff mount 1, the interior 47a of common selective ring shim 11a, the interior 49 of an installers pre drilled hole in fender 34 and through the rubber laminated washer, wherein the head 10a of shoulder bolt 10 is partially concealed within interior of counter bore 29, shown best in FIGS. 9 and 10. It should, again, be understood that the common selective ring shim 11a is provided and disposed at the void D1 between end face 32 of the second conical boss 28 of the upper standoff mount 1 and surface 43 of the fender 34 (FIGS. 5 and 10) to limit the deflection of perimeter edge 13 along bevel 26 of the upper mount 1, thus, providing positive lock down of the lamp and apparatus 2 along common axis L as locking nut 9 is tightened. Alternative to shim 11a, a setting compound can be applied to the end face 32 within Void D1 upon installation as such that when secondary assembly components 5 are partially secured with rubber laminated washer 8 and locking nut 9 can be, after curing of compound, secured fully providing a positive lock down along common axis L of upper stand 1 of the fender 34 of the vehicle.

What is claimed is:

1. A standoff apparatus for mounting a vehicle lamp or accessory equipment comprising:

an upper standoff capable of being disposed to a panel or a vehicle fender, said standoff captured between said vehicle fender and a housing of said vehicle lamp having at least one stud, wherein said supper standoff has a generally pyramidal body lofted along a common vertical central axis and having a steep front portion transitioning around fillets, continuing rearward and narrowing along steep symmetrically adjacent side portions and then, again, transitioning around fillets forming a relatively long sloping top rear portion adjacent to the said side portions with said portions having surfaces, thereof, establishing a surrounding exterior surface and wherein the said upper standoff also has a top portion configured as such to receive, flush, a portion of said housing of the vehicle lamp; a lower portion and a lower portion perimeter edge; an interior open to said lower portion; an interior surface; a lower portion beveled face intersecting said interior surface and surrounding exterior surface; a conical boss concentric to said common vertical axis, extending downward from said interior surface, having an end face constrained to within the interior, a conical bore along the common vertical axis through said conical boss and said top portion wherein, said stud can pass through, respectively, said conical bore, a common selective shim and a first drill hole in the fender; a second conical boss, extending generally downward, along an axis from the interior surface and having an end face constrained to within the interior; a conical bore through said axis concentric to the second elongated member and the top rear portion of the surrounding exterior surface; a common socket head bolt capable of passing through, respectively, said conical bore of the second elongated member, a second common selective shim; a second drilled hole in fender, and a common rubber laminated washer;

a conical lower adaptor having a surrounding surface concentric to an axis and having a small end face and an opposite large concave end face at a preferred angle to said axis and has a conical bore through and along said axis and is disposed to said stud with large end toward and in contact with an underside of said fender and is rotatable about its axis to accommodate various fender contours;

a shoulder bolt threadably connectable to stud, a common locking nut threadably connectable to the common socket head bolt whereas tightened draws ends faces of said conical boss and said second conical boss to the fender or selective shims, if used, locking components, through and relative to their axes, respectively, whilst the lower perimeter edge, acutely intersected by said beveled face and said surrounding exterior surface is capable of deflecting, thus seating uniformly and universally to said vehicle fenders of various contours, eliminating the need for a sealing method or gasket.

2. A standoff apparatus for mounting a vehicle lamp or accessory equipment according to claim 1 wherein the upper standoff bodies top portion has a semi-circular stepped saddle with predetermined radii along a horizontal front to back axis and an arc angles under 180°.

3. A standoff apparatus for mounting a vehicle lamp or accessory equipment according to claim 2 wherein the upper standoff bodies said top portions stepped saddle has semi circular surfaces and shoulders defined and constrained by a non-planer perimeter edge wherein the saddle is capable of receiving, in a preferred embodiment, a stepped cylindrical housing of a common single studded vehicle lamp.

4. A standoff apparatus for mounting a vehicle lamp or accessory equipment according to claim 3 wherein the upper standoff bodies lower perimeter edge is relatively large, in relationship to the said top portion perimeter edge, is non-planer and at a preferred angle in relation to a plane perpendicular the common vertical central axis.

5. A standoff apparatus for mounting a vehicle lamp or accessory equipment according to claim 4 wherein the lofted bodies surrounding exterior is fully defined, as such being constrained by the upper standoffs saddle perimeter edge and the lower portion perimeter edge.

6. A standoff apparatus for mounting a vehicle lamp or accessory equipment according to claim 5 wherein said body is shelled, hence, defining a periphery wall and an interior open to the lower portion wherein the said periphery wall has an end face defined by a continuous non-planer interior lower edge and the upper standoff bodies lower perimeter edge.

7. A standoff apparatus for mounting a vehicle lamp or accessory equipment according to claim 6 wherein the interior has interior surfaces at predetermined distances from and concentric to the faces and shoulders of the saddle and the lofted bodies surrounding exterior, respectively.

8. A standoff apparatus for mounting a vehicle lamp or accessory equipment according to claim 7 wherein the lower edge of the interior surface has been beveled having a beveled face intersecting the lower perimeter edge.

9. A standoff apparatus for mounting a vehicle lamp or accessory equipment according to claim 8 wherein the entire lower perimeter edge and beveled end face is configured, as such, being universally adaptable to, in a preferred embodiment, a vehicles flat, curved or convex fender as the interior of the upper standoff is capable of receiving a portion of the fender.

10. A standoff apparatus for mounting a vehicle lamp or accessory equipment according to claim 9 wherein a first conical boss, drafting inward, extending downward from the interior surface of the of the saddle along the common vertical central axis having an exterior surface defining an end face constrained to within the interior a predetermined distance, as such, providing a void between the end face and the said vehicle fender.

11. A standoff apparatus for mounting a vehicle lamp or accessory equipment according to claim 10 wherein the semi circular surface of the saddle is conically bored through and beveled, drafting inward, along the common vertical central axis through the first conical boss having an interior.

12. A standoff apparatus for mounting a vehicle lamp or accessory equipment according to claim 11 wherein extending generally downward from the interior surface of the long sloping top rear portion along a second common axis, being on a longitudinal plane through the common vertical central axis and generally perpendicular to the fender, is a second conical boss drafting inward and having an exterior surface defining an end face constrained to within the interior a predetermined distance, as such, providing a void between the end face and the said vehicle fender.

13. A standoff apparatus for mounting a vehicle lamp or accessory equipment according to claim 12 wherein the long sloping top rear portion is conically bored through, drafting inward, along the second common axis having an interior and a counter bore, drafting inward, having an interior.

14. A standoff apparatus for mounting a vehicle lamp or accessory equipment according to claim 13 wherein the upper standoff is molded or otherwise manufactured of a flexible material such as Thermo Polyurethane (TPU) and is configured to meet minimum draft angle guidelines for injection molding.

15. A standoff apparatus for mounting a vehicle lamp or accessory equipment according to claim 14 wherein the upper standoff mount, in the preferred embodiment, is capable of being, temporarily, poised to a vehicle fender, in a preferred location, such that a installer can indicate centers marks, on the said fender, through the top of the interiors of the first and second conical boss, for the purpose of drilling the said fender, first at the center mark indicated through the first conical boss and second through the center mark indicated through the second conical boss.

16. A standoff apparatus for mounting a vehicle lamp or accessory equipment according to claim 15 wherein the said common selective ring shim and the common selective ring shim of the secondary securing components are disposed on the said fender concentric to the first drilled and second drilled hole in the fender, respectively.

17. A standoff apparatus for mounting a vehicle lamp or accessory equipment according to claim 16 Wherein the upper standoff is disposed to the said fender and the housing of the lamp is fully disposed within the saddle, capturing the upper standoff between the lamp and the fender as such that the stud of the lamp passes through the interior of the first conical boss, the common selective ring shim and the first drilled hole, flanking the common selective ring shims between the end faces of the first conical and second conical boss and the fender, respectively.

18. A standoff apparatus for mounting a vehicle lamp or accessory equipment according to claim 1 wherein the said conical lower adaptors small end face is perpendicular to its axis and the large end face is convex and at a preferred angle to its axis.

19. A standoff apparatus for mounting a vehicle lamp or accessory equipment according to claim 18 wherein the conical lower adaptors is molded or otherwise manufactured of a flexible material such as Thermo Polyurethane (TPU) and is configured to meet minimum draft angle guidelines for injection molding.

20. A standoff apparatus for mounting a vehicle lamp or accessory equipment according to claim 17 wherein the conical lower adaptor is disposed concentrically on the stud of the lamp and rotatable about the axis of the stud as such orientating the concave end face flush to the underside of the fender whilst maintaining the smaller end face perpendicular to the said axis.

21. A standoff apparatus for mounting a vehicle lamp or accessory equipment according to claim 20 wherein the shoulder nut, further having a turned down portion and a shoulder, is threadably connectable to the stud of the lamp.

22. A standoff apparatus for mounting a vehicle lamp or accessory equipment according to claim 21 wherein the shoulder nut is threaded to the stud, wherein, the turned down portion of the shoulder bolt is capable of passing through the interiors of the washer, the lower adaptor, the first drilled the hole in the fender, the common selective ring shim and the conical boss.

23. A standoff apparatus for mounting a vehicle lamp or accessory equipment according to claim 22 wherein the socket head bolt of the secondary securing components is inserted along the second common axis through the interiors of the second conical boss, the second common selective ring shim, the second drilled hole in the fender and the rubber laminated washer as such, partially concealing the head of the socket head bolt within the interior of the counter bore and the locking nut is threaded to the socket head bolt.

24. A standoff apparatus for mounting a vehicle lamp or accessory equipment according to claim 23 wherein the shoulder nut and the and the locking nut are partially tightened as such that the entire lower perimeter edge and beveled face of the upper standoff mount, capable of flexing, deflects conforming to the fender eliminating any gaps that may exists.

25. A standoff apparatus for mounting a vehicle lamp or accessory equipment according to claim 24 whereas the shoulder nut and the locking nut are further tightened as such that further deflection of the perimeter edge and bevel face is limiting as the common selective ring shims are captured tightly between the end faces of the first and second conical bosses and the fender providing a positive lock down of the lamp and the apparatus to the fender through common vertical central axis and second common axis.

26. A standoff apparatus for mounting a vehicle lamp or accessory equipment according to claim 25 wherein alternative to the first and second common selective ring shims, a setting compound, E.G. an epoxy can be applied at the voids between the faces of the first and second conical bosses and the fender then partially tightening the shoulder nut and the locking nut, as such, that the upper standoffs lower portions perimeter edge and bevel face of the upper lamp standoff has fully conformed to the fender and then, thereafter, further tightening the shoulder nut and locking nut after the epoxy sets.

27. A standoff apparatus for mounting a vehicle lamp or accessory equipment according to claim 26 wherein the standoff apparatus facilitates a superior mounting than a standalone lamp as the upper standoff provides a large direct to the fender mounting footprint that is watertight, eliminating the need for a gasket.

28. A standoff apparatus for mounting a vehicle lamp or accessory equipment according to claim 27 wherein the standoff apparatus, offering an aerodynamic Original Equipment look that can be painted, as desired, to further customize and compliment the mounting of the apparatus to the vehicle.

* * * * *